Nov. 14, 1967 J. M. JURISICH 3,352,115
MEANS AND METHOD OF POSITIONING MATERIALS UNDER THE GROUND
Filed July 21, 1965 2 Sheets-Sheet 1
FIG. 1
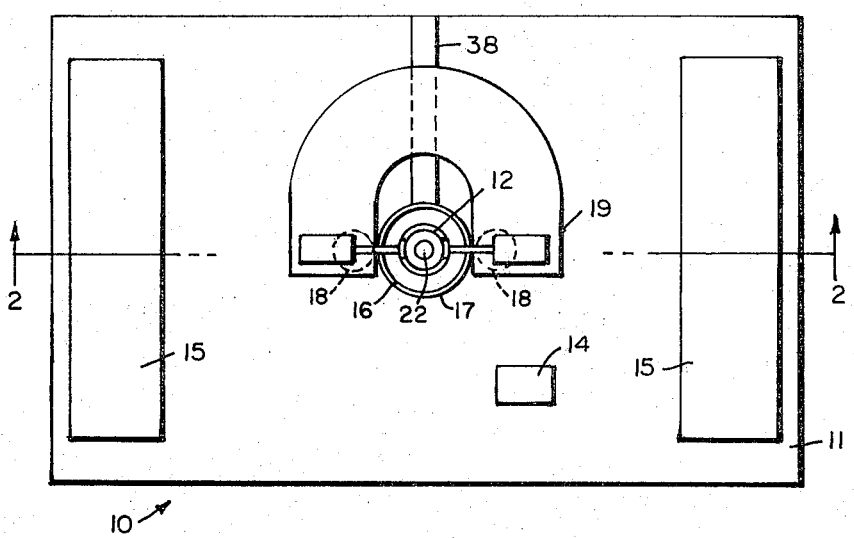
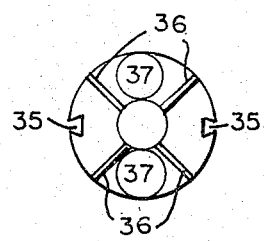
FIG. 4
INVENTOR
JOSEPH M. JURISICH
BY,
*Wolf, Greenfield + Hieken*
ATTORNEYS 3,352,115
MEANS AND METHOD OF POSITIONING
MATERIALS UNDER THE GROUND
Joseph M. Jurisich, 1654 Prentiss Ave.,
New Orleans, La. 70122
Filed July 21, 1965, Ser. No. 473,645
6 Claims. (Cl. 61—35)

ABSTRACT OF THE DISCLOSURE

An apparatus for burying waste material or garbage under the ground is provided which employs a screw spindle to compact the waste material in a hollow shaft and force it into underlying surrounding soft ground. A floatation means is preferably used in conjunction with the screw spindle and shaft to aid in transporting the device and forcing the waste material into the ground. The method of this invention comprises positioning a hollow open ended shaft over soft ground and driving the shaft downwardly into the ground. Waste material is then positioned in the shaft in an upwardly extending column and the column compacted to force the waste material into soft ground surrounding the shaft.

---

Garbage disposal has long been a problem for municipalities. Many garbage disposal methods are known including the use of incinerators, sanitary land fill measures and dumping at sea. All of these methods have some drawbacks which include high cost of operation, problems of sanitation, uneconomical land use and others.

Accordingly an important object of this invention is to provide a means and method for disposal of waste materials in compacted form under ground in a sanitary efficient manner.

Another important object of this invention is to provide a means and method in accordance with the preceding object which is relatively inexpensive and which allows rapid disposal with minimum labor costs.

Still another object of this invention is to provide a means in accordance with the preceding objects which can be used over water or soft ground thereby conserving usable land areas.

Still another object of this invention is to provide a means in accordance with the preceding objects which can be used to compact and position materials under soft ground for shoring up the ground and reinforcing it to improve the support ability of the ground.

According to the invention, an apparatus is provided for compacting and burying materials such as garbage and comprises an elongated substantially vertically extending hollow shaft having an opened lower portion. Compacting means extend in the shaft for reciprocation towards and away from the lower opened portion. A floatation means is interconnected with an upper portion of the shaft to provide for floating of the entire assembly on water. The floatation means contains a floodable compartment for permitting entrance of water. The entrance of water provides a weight for driving the shaft into soft ground with the lower opened portion of the shaft positioned below the surface of the ground. The shaft carries a means for placing waste material therein so that the waste material can be compacted and forced out of the opened lower portion beneath the surface of the ground. Preferably the compacting means is a substantially vertically extending screw having a compacting head. The screw is reciprocated by a motor, which is preferably carried by the floatation means, to move downwardly and compact the waste material and force it into the ground after which the screw is returned to its normally uppermost position.

According to the method of this invention, waste or other products are buried beneath the surface of the ground by positioning a hollow open ended shaft over soft ground. A substantial weight is placed on the hollow shaft to drive it downwardly into the ground. Waste or other material is then placed in the shaft in an upwardly extending column and compacted at its top to force the column out of the shaft into soft ground surrounding it.

These and other objects and features of this invention along with its incident advantages will be better understood and appreciated from the following detailed description of one embodiment thereof, selected for purposes of illustration and shown in the accompanying drawings in which:

FIG. 1 is a semidiagrammatic top plan view of an apparatus in accordance with this invention;

FIG. 4 is a cross sectional view taken through line 4—4 of FIG. 2.

Figure 2:
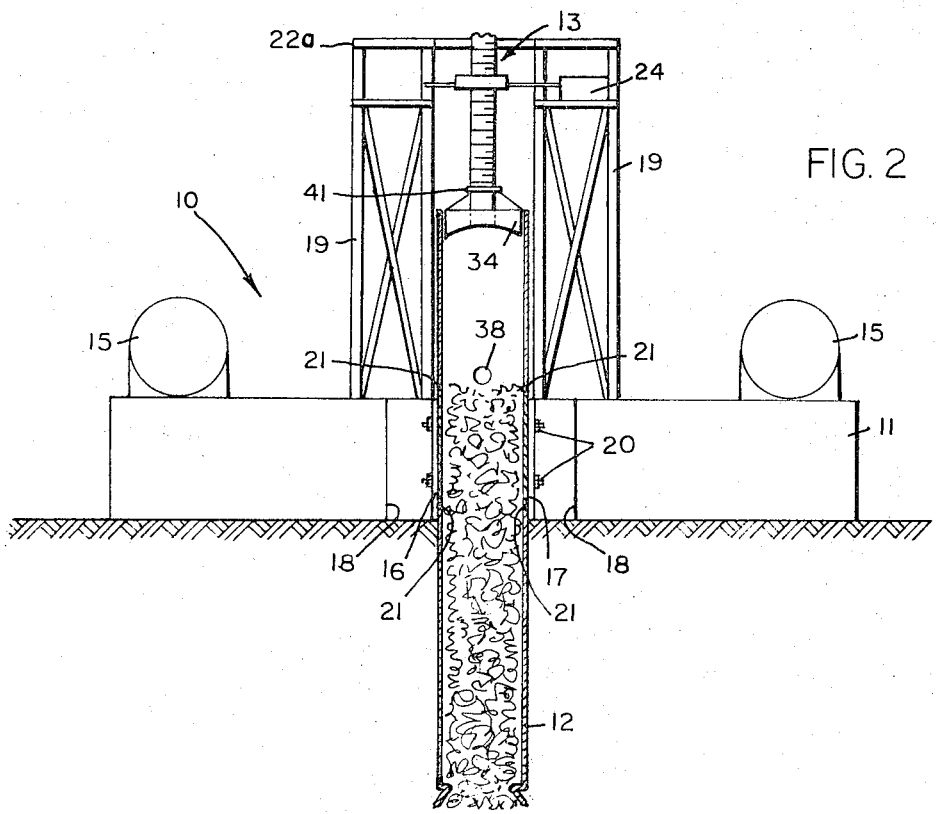
FIG. 2 is a cross sectional view thereof taken through line 2—2.

Turning now to the drawings and more particularly FIGS. 1 and 2, the apparatus for compacting and burying materials is indicated semidiagrammatically at 10 and comprises a barge 11, a hollow steel shaft 12 and a compressing screw 13.

The barge 11 may be any floatation means to float the compacting apparatus and provide variable weight to the assembly as will be described. Preferably the barge 11 is a steel barge divided into a number of watertight compartments which can be flooded with water to add substantial weight to the barge. For example, the steel barge is preferably generally square being approximately six feet high and having four outer sides each having a length of eighty feet. When the barge is compartmented, it is possible to flood some of the compartments as on one side of the barge to bury the shaft at an angle allowing for angular penetration of the shaft in soft soil if desired.

A pump shown diagrammatically at 14 is provided to fill or empty the barge with interconnected conventional water valves being piped to each compartment. Preferably additional water ballast means such as tanks 15 are provided to give additional weight to the barge. It should be obvious that any practical weight can be given to the barge by suitable dimensioning.

In the preferred embodiment the thin steel hull barge weighs approximately six hundred thousand pounds when empty and about two million, nine hundred eighty thousand, eight hundred pounds when completely flooded with sea water. The barge has a draft of about one foot when empty.

Preferably at the center of the barge there is located an aperture 16 for slidably and snugly receiving the hollow shaft 12 as will be described. The aperture 16 is preferably formed of a steel bulkhead wall 17. Two manholes comprising steel tubes 18 are located adjacent the aperture 16. Aperture 16 extends from top to bottom of the barge while the manholes 18 end at the lowermost portion of the barge and allow for entrance of workers to join the shaft 12 to the barge and adjust it as will be described.

Preferably a raised steel superstructure tower 19 is firmly welded or otherwise bolted to the barge in fixed relationship therewith on two sides of the aperture 16.

Aperture 16 receives an elongated hollow shaft 12 opened at both its top and bottom ends. The shaft 12 is preferably formed of steel tubing having substantial strength. The shaft 12 may be positioned with its lower end in the aperture 16 while the barge is floated on the water into a suitable position. Bolts, or other holding arrangements, such as 20 hold the shaft in its inoperative position. When the barge reaches the location at which it is to be operated, bolts 20 are released dropping the shaft 12 to the position where its uppermost edge lies within or slightly above the top of the barge 11.

Additional sections of steel tubing can be joined by conventional means to the shaft 12 forming an integral part thereof as at joints 21. When the shaft is in its operative position as shown in FIG. 2, bolts 20 are used to firmly anchor it to the barge 11.

Figure 3:
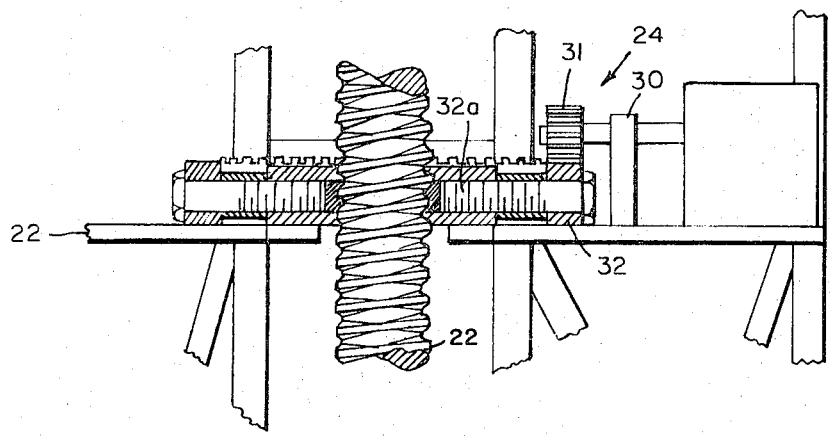
FIG. 3 is a side view of a gear assembly useful in this invention.

As best shown in FIGS. 2 and 3, a compressing screw arrangement 13 is arranged preferably perpendicular to the bottom surface of the barge and is mounted by a suitable support structure for reciprocation towards and away from the lower end of the shaft 12. Support structure 19 carries a series of gears and drive means indicated generally at 24. In the preferred embodiment of this invention screw spindle 22 is approximately forty feet long with a twelve inch diameter carrying square threads two inches deep and two inches in height. This results in a screw pitch of three threads per foot with the pitch or lift being four inches per revolution of the shaft. The specific size, and values given can be varied depending upon the particular purpose for which the assembly is used.

The clutch and drive arrangement 24 can be varied again depending upon the particular material being treated and the values desired. Any conventional gearing arrangement can be employed. In the preferred embodiment where the assembly is used for disposal of garbage, one particular preferred arrangement is shown in FIG. 3 where a three hundred horsepower diesel motor is interconnected with the screw through a clutch 30, reduction gear 31 having a ratio of fifteen to one, pinion gear 32 rotating at 168 r.p.m. with a gear ratio of 5.6 and a gear ring 32a revolving at 30 r.p.m. having a diameter of six feet. This provides stress on the shaft of approximately 25,200 horsepower. The motor can be operated to move the screw 13 upwardly or downwardly as desired. Plates 22 are provided fixed to the tower to prevent upward or downward movement of the ring gear. A steel plate 22a is threaded to the screw and mounted on the tower to support the screw in its raised position.

The lower portion of the screw carries a compacting head 34 preferably having a concave lower surface. The head 34 is conventionally mounted on the end of the screw allowing the screw to turn or rotate with respect to the head without corresponding rotational movement of the head. Preferably the head 34 has guide channels 35 as best shown in FIG. 4 suitably positioned to mate with corresponding guide rails (not shown) positioned and fixed to the inner wall of the shaft 12. Gusset plates 36 add additional strength to the head 34. In some embodiments of the invention the head 34 can have cutouts 37 to allow entrance of piling or other materials to be compressed. Openings 37 are capable of being closed by suitable cover plates bolted in position and not illustrated.

Preferably a feeding tube 38 is provided on the barge and has an opening 39 to the shaft 12 allowing filling of the shaft during use of the device when the head is raised in the position as shown in FIG. 2.

Turning now to the operation of the device of this invention, an assembly 10 is used preferably by floating the barge 11 on water of shallower depth than the height of the barge, over a soft ground area as over the seacoast or a river bottom. Shaft 12 is raised when the barge is being positioned. When a suitable site is selected, shaft 12 is lowered until its end touches bottom. At this point the barge 11 is preferably flooded with water while bolts 20 or other holding means are employed to lock the barge to the shaft. As the water fills the barge, the additional weight causes the lower end of the shaft 12 to sink within the soft ground. If desired, additional sleeves are then positioned over the upper end of the shaft 12 and joined thereto by conventional welding or bolting joining techniques as indicated at 21. Head 34 can be provided with suitable reciprocal radially extending projections shown diagrammatically at 41 which extend beyond the perimeter of the head. The screw spindle 22 is then actuated to press against the upper end of the sleeves after which the projections 41 are withdrawn. Due to the additional weight of the barge acting as a compressing force along with the screw, shaft 12 will then be driven further into the ground. In some cases the barge can be filled with water and lowered before lowering shaft 12. The shaft 12 is then lowered as above described.

When the desired depth of the shaft 12 is reached, bolts 20 which have been removed during the pressing downwardly of the shaft are again affixed so that the shaft is permanently attached to the barge. Extensions 41 are then permanently withdrawn or removed and the filling tube 38 used to fill the hollow shaft 12 with garbage or other material to be disposed of. When the shaft is filled, the screw 13 is operated to move downwardly compressing the garbage under the tremendous weight of the combined barge and water. This weight compresses the garbage and forces it out of the lower opened portion of the shaft 12 into the surrounding soft ground. The screw 13 is then moved upwardly and additional waste may be added to the tube and the process repeated.

When sufficient amounts of material are disposed under the ground in this method, the water ballast is pumped out of the barge and shaft 12 is raised. Shaft 12 can be raised by the use of radially extending bars such as 41 which act as hook means to cooperate with conventional slots or suitable projections (not shown) provided on the inside of the shaft 12.

While a particularly desirable embodiment of the invention has been shown and described for use in garbage disposal, it should be understood that the apparatus and method of this invention can also be applied to other uses.

For example a pointed out with relation to FIG. 4, pilings can be driven into the ground by the method and apparatus of this invention. In this case, shaft 12 extends only to the surface of the soft ground underlying the barge and the pilings are driven beyond the shaft into the ground by the screw spindle 22. Similarly, concrete filling material or other filling material can be forced into the ground to provide additional support for soft ground when bridges or other structures are used above the ground. The concrete fill, gravel or other supplementary supporting structure can firm up soft ground around a previously existing building or other structure if required.

While the assembly has been described for use over a water filled area, it can be used in swampy areas or over dry land by moving the barge as by truck to the position where it is desired to dispose of garbage or firm up the ground. The barge is then positioned on the ground, filled with ballast and the shaft 12 sunk as previously described.

The particular materials used as well as the various dimensions given can be varied depending upon the softness of the ground over which the assembly is positioned and the particular materials being treated. Therefore this invention is to be limited only by the spirit and scope of the appended claims.

What is claimed is:
1. An apparatus for burying waste material under the ground comprising,
    an elongated substantially vertically extending hollow shaft having an open lower portion,
    compacting means comprising a substantially vertically extending screw spindle having a cross sectional diameter substantially the same as the cross sectional diameter of said shaft extending in said shaft for reciprocation toward and away from said lower end,
    a flotation means interconnected with an upper portion of said shaft and said screw spindle with said shaft being capable of extending below said flotation means,
    said flotation means containing a floodable compartment for permitting entrance of ballast thereto to provide a weight for driving said shaft into soft ground with said open lower portion positioned below the surface of the ground.
means for placing said material in said shaft whereby said material is compacted by said compacting means and forced out of said open lower portion beneath said ground.

2. An apparatus in accordance with claim 1 wherein said screw spindle has a lower compacting head,
said head carrying means for contacting said shaft to raise or lower said shaft with respect to said flotation means.

3. An apparatus in accordance with claim 1 further comprising,
means for rotating said spindle about its axis with respace to said flotation means to raise and lower said spindle within said hollow shaft.

4. An apparatus in accordance with claim 3 wherein said means for raising and lowering said threaded spindle comprises a motor interconnected with said spindle through gear linkage means.

5. A method of burying garbage and the like in soft ground comprising,
positioning a hollow open ended shaft over soft ground,
placing a substantial weight on said hollow shaft to drive it downwardly partially into said ground,
placing said garbage in the portion of said shaft extended above ground in an upwardly extending column of garbage,
and compacting the top of said column to force said column out of said shaft into the soft ground surrounding said shaft.

6. A method in accordance with the method of claim 5 wherein said column is compacted by a reciprocating screw spindle means.

References Cited

UNITED STATES PATENTS

| | | | |
|---|---|---|---|
| 985,583 | 2/1911 | Granger | 100—289 |
| 1,650,827 | 11/1927 | Friz | 61—36 X |
| 1,764,948 | 6/1930 | Frankignoul | 61—53.6 |
| 2,652,693 | 9/1953 | Goldman et al. | 61—46.5 |
| 2,976,693 | 3/1961 | Showalter | 61—46.5 |
| 3,013,675 | 12/1961 | Schonrock | 100—229 |
| 3,184,924 | 5/1965 | Staunau | 61—53.6 |

FOREIGN PATENTS 349,644   3/1905   France.

JACOB SHAPIRO, *Primary Examiner.*